E. STEWART.
WHEEL.
APPLICATION FILED MAR. 17, 1909.

937,969.

Patented Oct. 26, 1909.
2 SHEETS—SHEET 1.

Witnesses
Morris Lessin
E. M. Ricketts

Inventor
Edward Stewart
By
Watson E. Coleman, Attorney

E. STEWART.
WHEEL.
APPLICATION FILED MAR. 17, 1909.
937,969.
Patented Oct. 26, 1909.
2 SHEETS—SHEET 2.
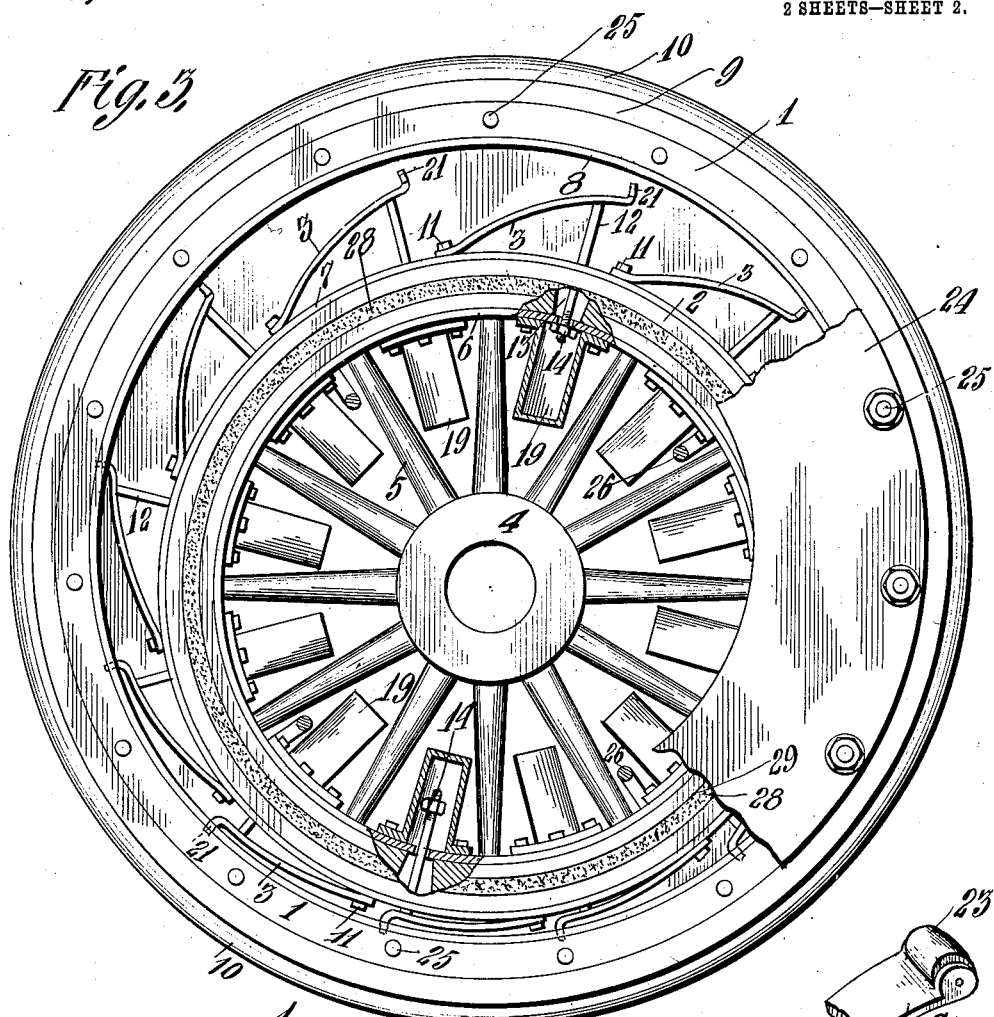
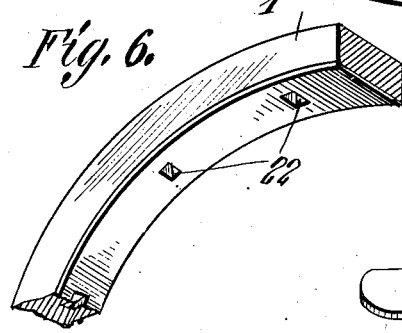
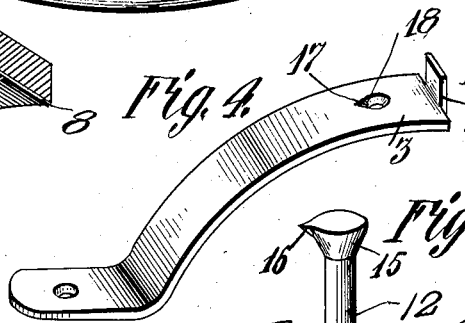
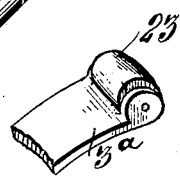
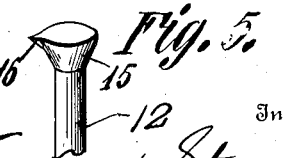
Witnesses
Morris Lessin
E. M. Ricketts
Inventor
Edward Stewart
By Watson E. Coleman
Attorney

UNITED STATES PATENT OFFICE.

EDWARD STEWART, OF KANSAS CITY, MISSOURI.

WHEEL.

937,969.  Specification of Letters Patent.  Patented Oct. 26, 1909.

Application filed March 17, 1909. Serial No. 483,914.

*To all whom it may concern:*

Be it known that I, EDWARD STEWART, a citizen of the United States, residing at Kansas City, in the county of Jackson and State of Missouri, have invented certain new and useful Improvements in Wheels, of which the following is a specification, reference being had to the accompanying drawings.
This invention relates to improvements in resilient or cushioned vehicle wheels of that class in which springs are employed to take the place of pneumatic tires.

The object of the invention is to provide a simple, practical and effective wheel of this character especially adapted for use on automobiles and motor vehicles.

With the above and other objects in view, the invention consists of the novel features of construction and the combination and arrangement of parts hereinafter fully described and claimed, and illustrated in the accompanying drawings, in which—

Figure 1:
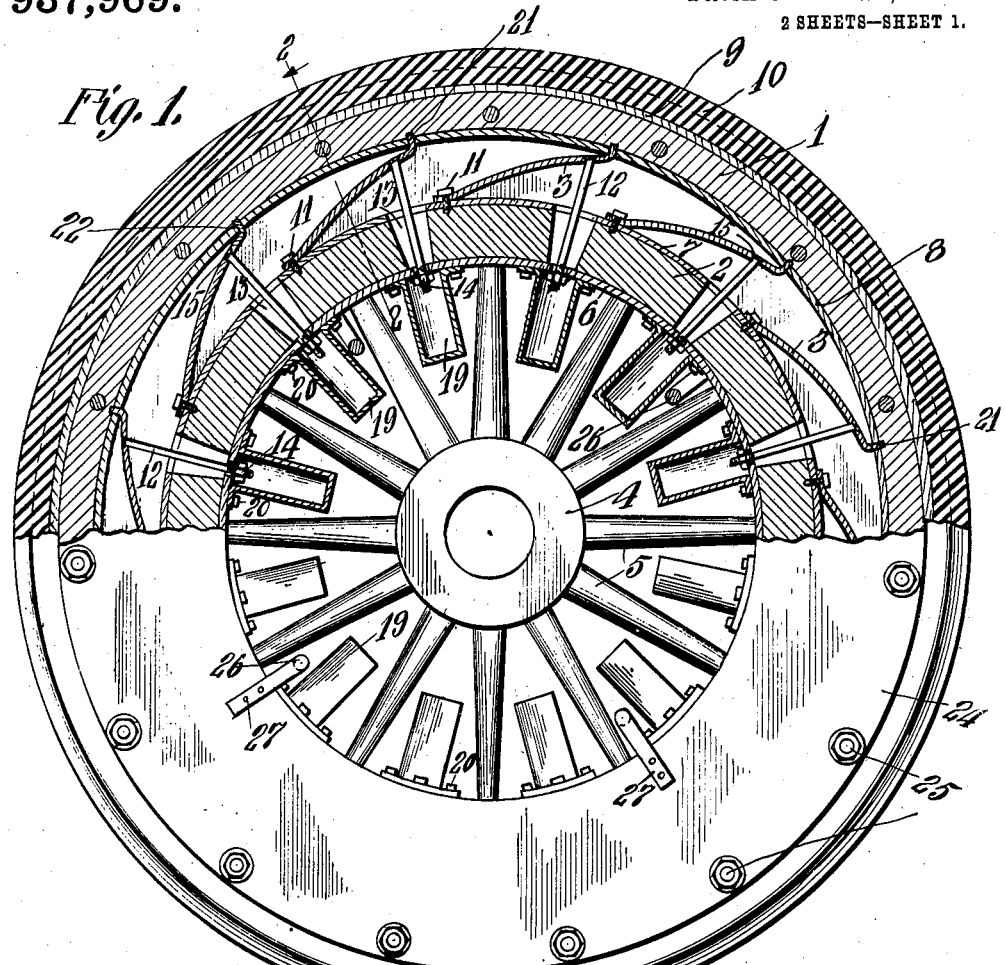
Figure 2:
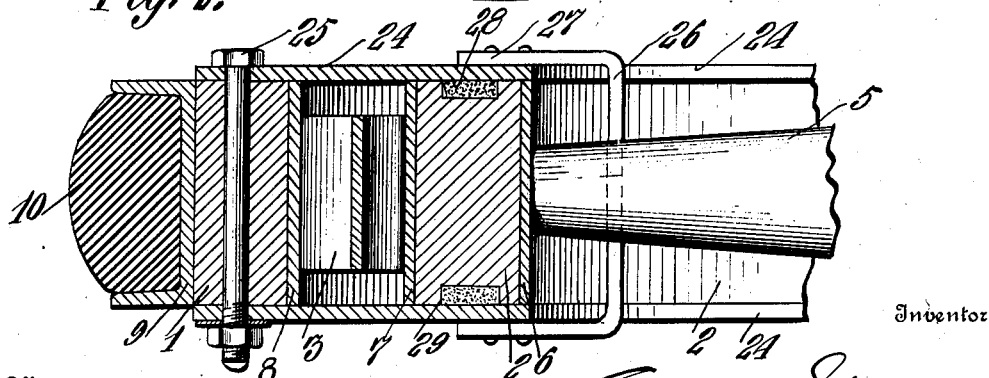

Figure 1 is a side elevation with parts broken away and in section showing the parts of the wheel in normal position; Fig. 2 is a detail section taken on the plane indicated by the line 2—2 in Fig. 1; Fig. 3 is a side elevation of the wheel with parts broken away and in section and showing the position of the different parts when the wheel is under severe strain; Fig. 4 is a detail perspective of one of the springs; Fig. 5 is a perspective of the head of one of the fastening bolts for the springs; Fig. 6 is a sectional perspective of a portion of the outer rim of the wheel; and Fig. 7 is a detail perspective of the outer end of a modified form of spring.
The invention comprises outer and inner concentric rims 1, 2 spaced apart by an annular series of leaf springs 3, the inner rim 2 forming the rim proper of a rigid inner wheel having a hub 4 and radiating spokes 5. The inner rim 2 when made of wood or the like has its outer and inner faces covered by metal bands 6, 7, as clearly shown in Fig. 1. The outer rim 1 when made of metal has its inner face covered with a metal band or ring 8 and upon its outer face is a channeled tire or band 9 containing a cushioning tire or tread surface 10 of rubber or the like.

Each of the springs 3 has one of its ends fixed by a screw, bolt or the like 11 to the periphery of the inner rim 2, as shown in Fig. 1, and the outward movement of the other or free end of said spring is limited by an adjusting rod 12 preferably in the form of a bolt. Said rods 12 of the several springs are disposed radially and project through radial openings 13 formed in the rim 2, their screw threaded inner ends being provided with adjusting nuts 14, whereby said springs may be adjusted.

To prevent the bolts or rods 12 from turning when the nuts 14 are being screwed upon them, the cone-shaped heads 15 of the bolts are formed with radially projecting lugs 16 which are adapted to seat in notches 17 formed in the countersunk openings 18 in the springs, which openings receive said heads 15 of the bolts, as will be readily understood upon reference to Figs. 4 and 5. To protect the bolts 12 from moisture and mud, removable tubular caps 19 have their flanged ends secured, as at 20, to the inner face of the rim 2 at a point over the inner ends of the bolts, as clearly shown in Fig. 1 of the drawings. The free outer ends of the springs 3 are adapted to bear against the inner face of the outer rim 1 so as to hold the same concentric with the inner rim when there is no undue load or strain upon the wheel. For the purpose of preventing the inner and outer rims from slipping within each other, the outer or free ends of the springs 3 are provided with projections 21 adapted to enter recesses or sockets 22 formed in the inner face of the outer rim 1. Said projections 21 may be in the form of bent fingers, as shown in Figs. 1, 3 and 4 or they may be in the form of an anti-friction roller 23 journaled on the outer end of the spring $3^a$, as will be seen upon reference to Fig. 7.

For the purpose of protecting the springs and excluding water, moisture, mud, etc., from between the two rims of the wheel, side plates 24 are secured to the opposite sides of the outer rim 1 by transverse bolts 25. Said side plates are annular in form and are preferably but not necessarily made in one piece as shown. They are also of such width as to project over and engage the side faces of the inner rim 2, as shown in Fig. 1. To strengthen and support said side plates 24, they may be connected at intervals by U-shaped brackets 26, the cross portions of which latter extend between the spokes and across the inner face of the inner rim 2 and the parallel ends of which are secured, as shown at 27, to the outer faces of the side plates 24. To further insure the exclusion of moisture and dirt from the space between the rims 1, 2, annular packing rings or strips 28 may be arranged between said plates and the outer side faces of the inner rim 2. As illustrated, said packing 28 is arranged in annular grooves 29 formed in the rim 2, as shown in Figs. 2 and 3 of the drawings.

In operation, the nuts 14 of the adjusting bolts 12 are adjusted according to the normal load upon the wheel so that ordinarily the outer rim 1 will be concentric with the inner rim 2 and yieldably supported from the same by the springs 3. When an extreme load or any extreme strain is placed on the wheel, the two rims assume positions more or less eccentric to each other, the extreme eccentric position being shown in Fig. 3, upon reference to which it will be noted that the lowermost springs 3 are compressed while the uppermost springs are out of contact with the outer rim. The instant undue strain is removed from the wheel the springs will return the two rims to their normal position shown in Fig. 1.

Having thus described the invention what is claimed is:

1. A resilient wheel comprising rigid inner and outer rims, the outer rim being provided upon its inner face with an annular series of recesses, an annular series of leaf springs arranged between the rims and inclined in the same direction, the inner ends of said springs being rigidly secured to the inner rim, and their outer ends being reduced to provide projections to enter the recesses in the outer rim, and means between the intermediate portions of the springs and the inner rim for limiting the outward movement of the reduced free ends of said springs.

2. A resilient wheel comprising an inner rigid wheel having a hub, radiating spokes, and an annular rim formed with radial openings, said rim also having in its side faces annular grooves, inner and outer circular reinforcing plates upon the inner and outer faces of said rim, said plates being formed with openings to register with the radial openings in the rim, the openings in the inner plate being smaller than those in the outer one, an outer rim, a circular plate secured upon the inner face of the outer rim and formed with an annular series of recesses, a channeled tire upon said outer rim, a cushioning tire in said channeled tire, an annular series of leaf springs having their inner ends rigidly secured to the outer plate on the annular rim, the free outer ends of said springs having means to enter the recesses in the circular plate in the outer rim, adjusting and stop bolts secured at their outer ends to said springs and having their inner ends arranged in the registering openings in the annular rim and the plates upon the latter, annular side plates secured to the side faces of the outer rim and extending over the grooved side faces of said annular rim, packing in the grooves in said annular rim and U-shaped connecting brackets arranged between the spokes and extending across and spaced from the inner plate of the annular rim, the outwardly projecting parallel ends of said brackets being secured to the outer faces of said annular side plates.

In testimony whereof I hereunto affix my signature in the presence of two witnesses.

EDWARD STEWART.

Witnesses:
H. C. ANDERSON,
RAY WOLFE.